(12) United States Patent
Lin et al.

(10) Patent No.: US 6,753,767 B2
(45) Date of Patent: Jun. 22, 2004

(54) CODE LEARNING DEVICE OF TIRE PRESSURE MONITOR

(75) Inventors: Jordan Lin, Kaohsiung (TW); Frank Kuan, Kaohsiung (TW); Sheng Hsiung Lin, Kaohsiung (TW)

(73) Assignee: Lite-On Automotive Corporation, Kaohsiung (TW)

( * ) Notice: Subject to any disclaimer, the term of this patent is extended or adjusted under 35 U.S.C. 154(b) by 18 days.

(21) Appl. No.: 10/144,852

(22) Filed: May 15, 2002

(65) Prior Publication Data

US 2002/0171539 A1 Nov. 21, 2002

(30) Foreign Application Priority Data

May 17, 2001 (TW) ........................................ 90112305 A

(51) Int. Cl.[7] .............................................. B60C 23/02
(52) U.S. Cl. ....................... 340/442; 340/447; 73/146.2
(58) Field of Search ................................ 340/442, 445, 340/447; 73/146.2, 146.5, 146.8

(56) References Cited

U.S. PATENT DOCUMENTS

| | | | |
|---|---|---|---|
| 4,450,431 A | * | 5/1984 | Hochstein .................... 340/447 |
| 4,567,460 A | * | 1/1986 | Gebler ........................ 340/442 |
| 5,546,070 A | * | 8/1996 | Ellmann et al. ............. 340/442 |
| 6,463,798 B2 | * | 10/2002 | Niekerk et al. ............. 73/146.2 |

* cited by examiner

Primary Examiner—John Tweel
(74) Attorney, Agent, or Firm—Stevens, Davis, Miller & Mosher, LLP.

(57) ABSTRACT

A code learning device of a tire monitor is used for motor vehicles having a tire monitor and a plurality of sensors, whereby each sensor is installed in individual tires of the motor vehicle, and each sensor module includes a radio signal transmitter for transmitting the conditions of the tires and the specific code of the sensor module via radio frequency signals. The code learning device includes an electric module having a processor, a memory, and a radio frequency signal receiver electrically coupled to the electric module for receiving the radio frequency signals, and dividing the radio frequency signals into a data signal and an amplitude signal. The data signal includes the conditions of the tires and the specific code of the sensor module such that the electric module can confirm the corresponding relation between the tires and the sensor module by way of the numeric value of the amplitude signal.

5 Claims, 3 Drawing Sheets

CODE LEARNING DEVICE OF TIRE PRESSURE MONITOR

BACKGROUND OF THE INVENTION

1. Field of the Invention

The present invention relates to a code learning device of a tire pressure monitor, and more particularly to a code learning device that makes the code learning process for a tire pressure monitor become more convenient and faster.

2. Description of the Related Art

The related technologies and devices for confirming the relative positions of the tire pressure monitor and the tires have been mentioned for many times in the conventional arts. For example, the present Assignee has filed Taiwan Patent Application No. 089117036 entitled "Method and Apparatus for Monitoring Inflated Tire" filed on Aug. 22, 2000, and has mentioned that such device has a sensor module installed in each of the inflated tires for sensing the conditions of the tires. After being coded, the conditions of the tires are transmitted by radio frequency signals. Such device is also equipped with a decoder module comprising a radio frequency antenna module for receiving the radio frequency signals transmitted by the sensor module; a memory for recording the data on the conditions of the tires in a predetermined range and the monitoring data on the conditions of the tire; a processor for decoding the received radio signals and comparing the decoded signals with the data in the memory to determine the application condition of the inflated tires; a display device for showing the application condition of the inflated tires; and a buzzer. Such device is used to monitor the abnormal conditions of tire pressure and temperature and identify each tire for confirming the tire which is in the abnormal condition.

However, in the conventional art, when the decoder module and the sensor module in each of the inflated tires confirm the code, the operator has to deflate the tires of the motor vehicle. Taking advantage of the rapid change of the tire pressure, the sensor modules in the tires can transmit continual signals which can be decoded by the decoder module, thereby confirming the relative positions of the tires of which such sensor modules are installed. Then, the deflated tires of the motor vehicle have to be inflated again before reusing. Obviously, such process is relatively time consuming, inconvenient, and complicated.

Therefore, the foregoing code learning method is unable to provide a fast and effective coding and decoding modules for the tire pressure monitor installed in the motor vehicle and to define the specific code of each inflated tire. It is necessary to provide a coding method and apparatus for monitoring the tire pressure, thereby making the coding process for the tire pressure monitor become simpler and faster.

SUMMARY OF THE INVENTION

The primary objective of the present invention is to provide a coding device for the tire pressure monitor which can identify the installed tire pressure monitor without affecting the operation of the tires.

In order to accomplish the aforementioned objective, the present invention provides a coding device for the tire pressure monitor that can be used in a motor vehicle having a tire pressure monitor, wherein a plurality of sensors are installed in each tire. Each sensor module has a radio signal transmitter for transmitting the conditions of the tires and the specific code of each sensor module via radio frequency signals. The present coding device comprises an electric module having a processor and a memory; and a radio frequency signal receiver electrically coupled to such electric module for receiving the radio frequency signals, and dividing the radio frequency signals into a data signal and an amplitude signal wherein the data signal comprises the conditions of the tire and the specific code of the sensor module, such that the electric module can confirm the correspondence relation between the tire and the sensor module installed in it via the data of the amplitude signal.

Another feature of the coding device of the tire pressure monitor according to the present invention comprises 3 slave electric modules, wherein each has a processor and a memory; 3 radio signal receivers, wherein each receiver is electrically coupled to the three slave electric modules for receiving the radio frequency signals, and dividing the radio frequency signals into a data signal and an amplitude signal, wherein the data signal includes the conditions of the tire and the specific code of the sensor module; and a serial data input and a serial data output electrically coupling to the three slave electric modules for data transmission.

Therefore, the electric module and the slave electric modules correspond to the four tires of the motor vehicle, and the corresponding relation between the four tires and the sensor modules installed in them can be confirmed via the value of the amplitude signal.

To make it easier for our examiner to understand the aforementioned and other objectives, innovative features, and advantages of the present invention, we use preferred embodiments together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DESCRIPTION OF THE PREFERRED EMBODIMENT

Figure 1:
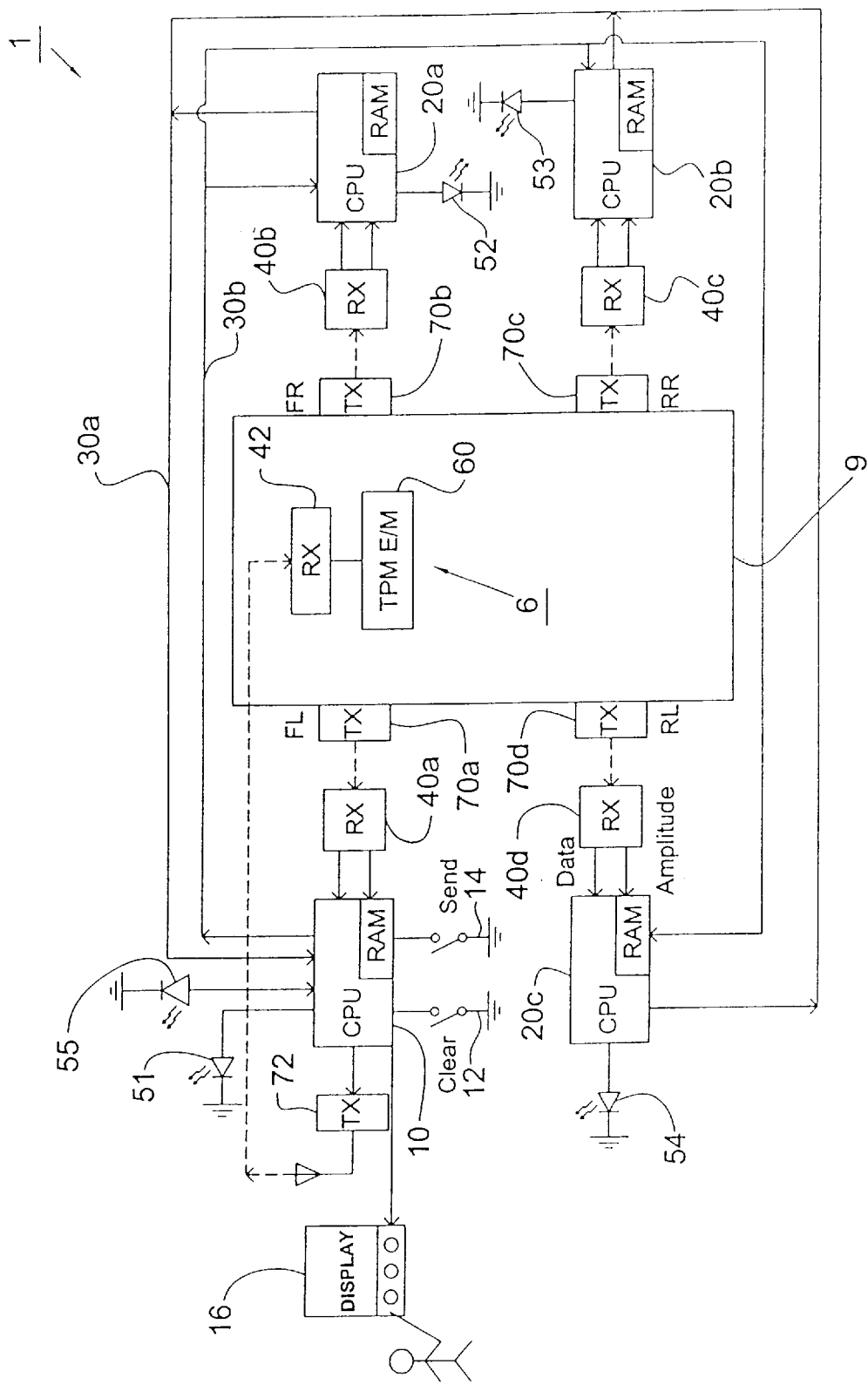
FIG. 1 is a block diagram of the code learning device of the tire pressure monitor according to the present invention.

Please refer to FIG. 1 which is the block diagram of the code learning device 1 of the tire pressure monitor according to the present invention. In the figure, the coding device 1 comprises a master electric module 10 installed in the place proximate to the front left (FL) wheel of a motor vehicle 9 for data processing, receiving and transmitting; and three slayer electric modules 20a, 20b and 20c respectively installed in the places proximate to the front right (FR) wheel, the rear right (RR) wheel, and the rear left (RL) wheel for data-processing, receiving, and transmitting.

The master electric module 10 is serially coupled to the slave electric modules 20a, 20b and 20c by a serial data input and a serial data output (SDI/SDO) 30a and 30b for data transmission. The master electric module 10 has a radio signal receiver 40a, and the slave electric modules 20a, 20b and 20c have radio signal receivers 40b, 40c and 40d for receiving the radio frequency signal (RF Signal). The master electric module 10 and the slave electric modules 20a, 20b and 20c are substantially composed of a processor and a memory, and further, the master electric module 10 has a radio frequency transmitter 72 for transmitting radio frequency signals.

A motor vehicle 9 has a tire pressure monitor, which further comprises a plurality of sensor modules, installed in each tire respectively. Each sensor module further comprises an sensor-specific ASIC (Application-Specific Integrated Circuit) and radio frequency transmitters 70a, 70b, 70c and 70d, wherein the ASIC can be the IB01290 of the LITE-ON Company. The sensor modules individually installed in the inflated tires are used to sense the tire condition, and transmit the radio frequency (RF) signals after the tire conditions are coded. The sensor-specific ASIC will transmit the data of the current tire temperature and pressure via the radio signal transmitters 70a, 70b, 70c and 70d every minute. The tire pressure monitor further comprises a decoder module 6 installed in the motor vehicle, which has a radio signal receiver 42 for receiving the data of the tire transmitted from the radio signal transmitters. The sensor module and the decoder module 6 can be seen in Taiwan Patent Application No. 089117036 entitled "Method and Apparatus for Monitoring Inflated Tire" filed on Aug. 22, 2000. Such patent application is incorporated herein by reference.

The signals of the data of the tire temperature and pressure which are transmitted from the sensor-specific ASIC via radio signal transmitters 70a, 70b, 70c and 70d further include the specific code of the sensor-specific ASIC. The decoder module 6 further includes an electric module 60 of the tire pressure monitor for reading the data of the tire condition and the specific code, and it has a built-in memory for recording the specific code of the sensor-specific ASIC and facilitating the identification of the sensor-specific ASIC installed into individual tires.

Figure 2:
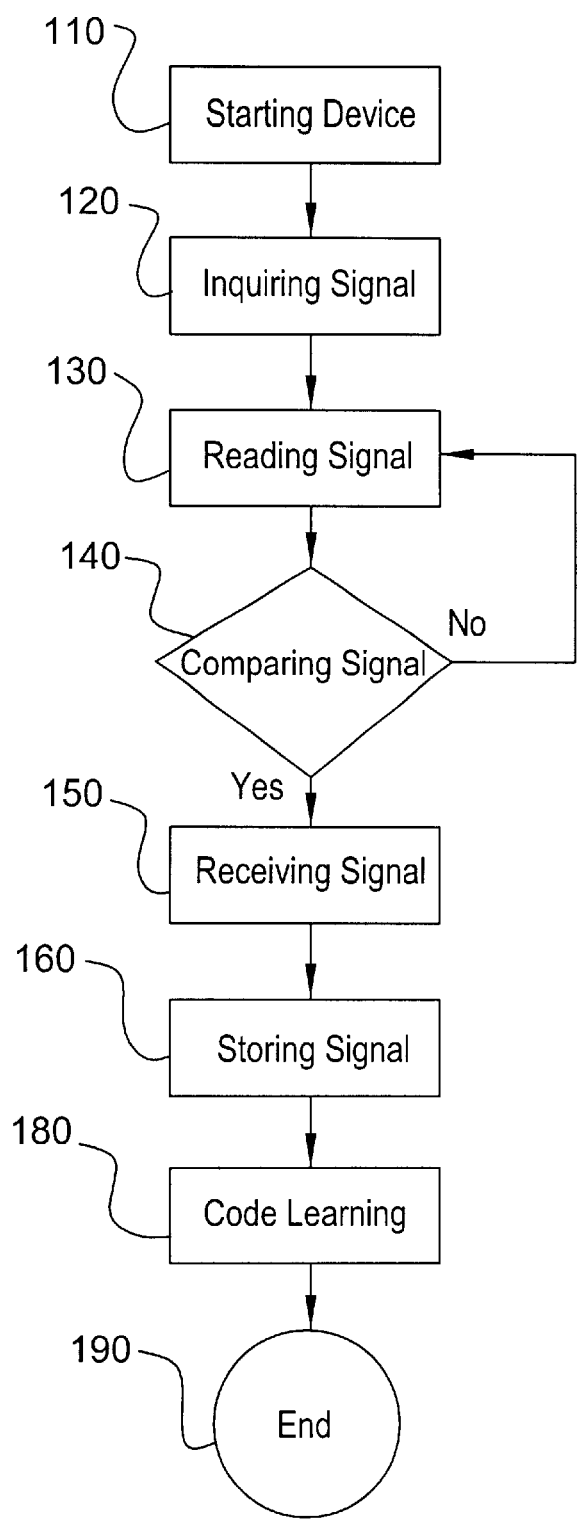
FIG. 2 is a flow chart of the code learning device of the tire pressure monitor according to the present invention.

Please refer to FIG. 2 which is the flowchart of the coding method for the coding device 1 of the tire pressure monitor according to a preferred embodiment of the present invention. First, in step 110, as soon as the motor vehicle 9 is driven to a fixed position, the coding device 1 is turned on. The clear button 12 of the master electric module 10 is pressed, and the master electric module 10 and the slave electric modules 20a, 20b and 20c will clear the data stored in the internal memory and the device then proceeds to step 120. Further, as shown in FIG. 1, when the motor vehicle 9 is in a fixed position, the radio signal receivers 40a, 40b, 40c and 40d of the coding device 1 are respectively proximate to the front left (FL) wheel, the front right (FR) wheel, the rear right (ER) wheel, and the rear left (RL) wheel of the motor vehicle 9.

In step 120, the master electric module 10 will start the radio signal receiver 40a via itself and the serial data output 30b, and the device then proceeds to step 130 after the radio signal receivers 40b, 40c and 40d of the slave electric modules 20a, 20b and 20c start to receive the radio frequency signals.

In step 130, the radio signal receivers 40a, 40b, 40c and 40d of the master electric module 10 and the slave electric modules 20a, 20b and 20c of the code learning device 1 according to the present invention will receive radio frequency signals, and divide the RF signal into a data signal and an amplitude signal. The data signal includes the tire conditions detected by the tire sensor module and the specific code of the tire sensor module. The radio signal receivers 40a, 40b, 40c and 40d will send the data signal and amplitude signal to the master electric module 10 and the slave electric modules 20a, 20b and 20c separately. The device then proceeds to step 140.

In step 140, each processor will compare the amplitude signals input by the radio signal receivers 40a, 40b, 40c and 40d. The predetermined value used in the preferred embodiment of the present invention is 2 volts. If the value of the amplitude is lower than the predetermined value, the device then goes back to Step 130. Otherwise, the device will proceed to step 150. Those skilled in the art all know that the amplitude of the radio frequency signal is substantially inversely proportional to the cube of the distance. For example, the radio signal receiver 40a will receive the signals transmitted from the radio signal transmitters 70a, 70b, 70c and 70d, but the amplitude value of the signal transmitted from the radio signal transmitter 70a will be far larger than the amplitude value of the signals transmitted from the other three radio signal transmitters 70b, 70c and 70d. Therefore, when the value of the amplitude is larger than such predetermined value, then the received signal transmitted from the corresponsive radio signal transmitter 70a can be confirmed. The device then proceeds to step 150.

In step 150, the processors of the master electric module 10 and the slave electric modules 20a, 20b and 20c record the specific code of the received data into the memory. Furthermore, the light emitted diodes (LED) 51, 52, 53, and 54 are installed in the master electric module 10 and the slave electric modules 20a, 20b and 20, respectively. When the LED 51, 52, 53, or 54 is lit, it indicates that the radio signal receiver 40a, 40b, 40c, or 40d of the electric module at that end has already received the data from the radio signal transmitter 70a, 70b, 70c, or 70d in the corresponding tire. In other words, the memory of the master electric module 10 and the slave electric modules 20a, 20b and 20c respectively record the specific codes in the corresponding tires. The device then proceeds to step 160.

In step 160, the master electric module 10 reads the specific code from the corresponding tire saved in the slave electric modules 20a, 20b and 20c by the serial data input 30a and output 30b. It takes about two minutes for completely receiving the data transmitted from the radio signal transmitters 70a, 70b, 70c and 70d in each tire. The device then proceeds to step 180. The master electric module 10 further has a LED 55. When the LED 55 is lit, it indicates that the electric module 10 has completed recording the specific code of sensor modules equipped in each individual tire of the motor vehicle 9.

In step 180, after the operator has turned the key of the motor vehicle 9 in the sequence of on and off for four times, the decoding circuit of the electric module 60 of the tire pressure monitor installed in the motor vehicle 9 starts to enter into the receiving process of the coding. After the operator presses the send button 14 of the master electric module 10, the master electric module 10 will send the specific code of the sensor module in each tire of the motor vehicle 9 and the corresponding relation of the positions of the tires to the electric module 60 of the tire pressure monitor. The electric module 60 of the tire pressure monitor can correctly detect the conditions of the tires by the specific code and the corresponding relation of the positions of the tires. The device then proceeds to step 190. In addition, the master electric module 10 of the code learning device 1 of the present invention is connected to a screen monitor 16, so that the operator can observe the current operation of each element of the device 1.

Finally, in step 190, after the present coding device has successfully learned the code of the vehicle 9, the vehicle 9 is driven away from the coding device 1 to finish the code learning process. By such arrangement, the coding device makes the code learning process for the tire pressure monitor more convenient and faster.

Figure 3:
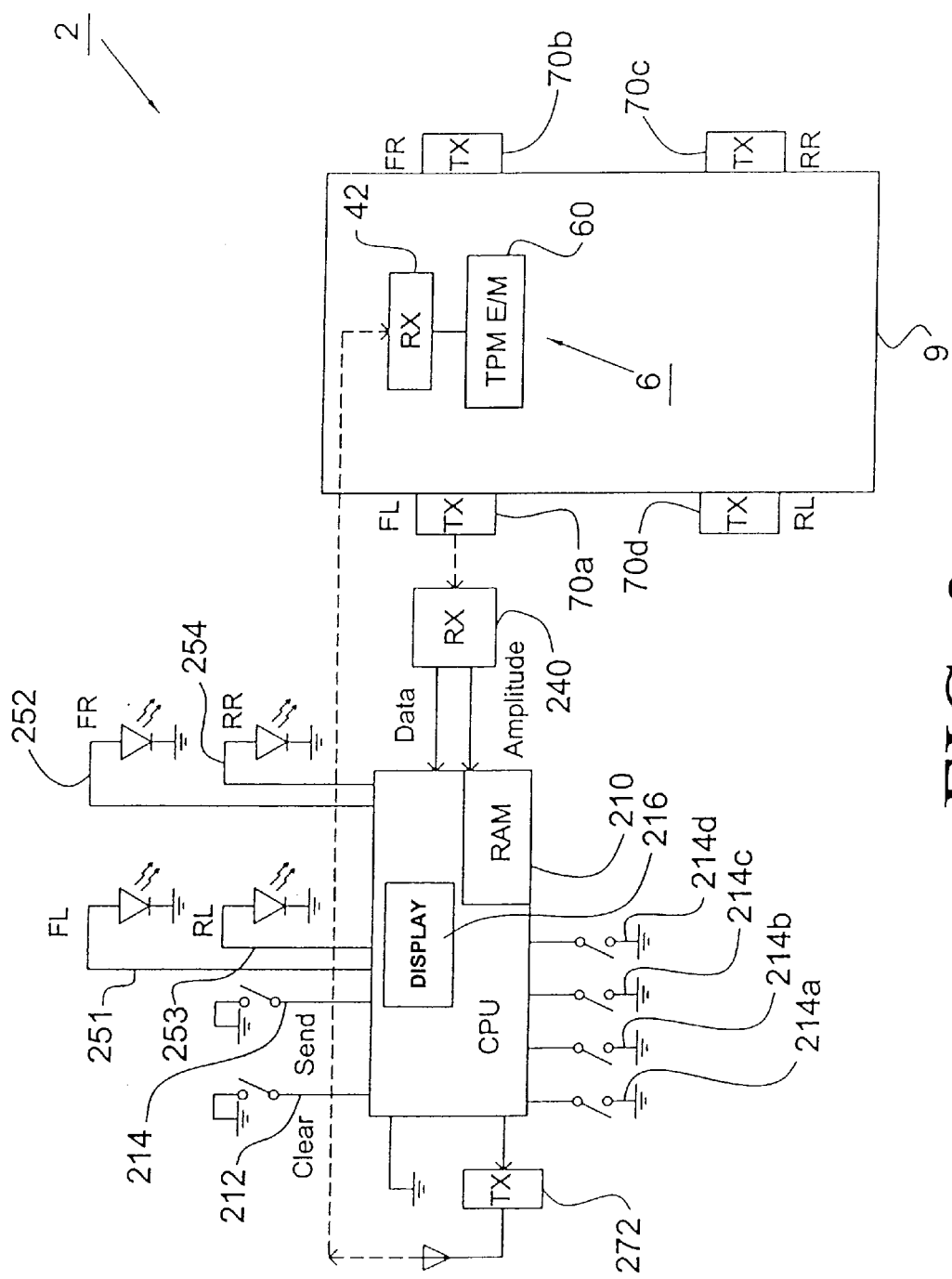
FIG. 3 is a block diagram of the hand kit code learning device of the tire pressure monitor according to the present invention.

Please refer to FIG. 3 which is the block diagram of the hand kit code learning device 2 of the tire pressure monitor according to another preferred embodiment of the present invention. Similar numbers are used for the similar components and features of the code learning device 1. The hand kit code learning device 2 may be hand-held by an operator and comprises an electric module 210, which has a built-in memory, data processing, and receiving and transmitting interfaces; a radio signal receiver 240 coupled to the electric module 210 for receiving the radio frequency signal; and a radio frequency signal transmitter 272 coupled to the electric module 210 for transmitting the radio frequency signal. Compared with the code learning device 1, the hand kit code learning device 2 is lighter and can be used in various environments, and the code learning process of the tire pressure monitor becomes simpler and more flexible.

The hand kit code learning device 2 is characterized in that it only provides an electric module 210 and the corresponding radio signal receiver 240. The hand kit code learning device 2 further provides 4 buttons 214*a*, 214*b*, 214*c* and 214*d*. Therefore, in the code learning process, operators must place the code learning device 2 near each of the tires of the motor vehicle 9, and use the four buttons 214*a*, 214*b*, 214*c*, and 214*d* of the hand kit code learning device 2 to confirm the corresponding positions of the tires. For example, when placing the code learning device 2 near the front left wheel of the motor vehicle 9, the operator must press the button 214*a* for receiving the radio frequency signal. As described previously, since the transmission distance of the radio frequency signal affects the amplitude of the signal, only the specific code of the nearest tire (i.e. the front left wheel in this case) will be recorded. Then, the operator approaches other tires and presses the corresponding buttons to obtain the specific codes and the correct corresponding relation of the positions of the tires. Furthermore, in a similar way to the code learning device 1, the hand kit code learning device 2 can transmit the specific code and the corresponding relation of the tire positions to the electric module 60 of the tire pressure monitor of the motor vehicle 9 via the radio frequency signal transmitter 272.

While the present invention has been described by way of examples and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A code learning device for tire pressure monitor, applicable in a motor vehicle with a tire pressure monitor, and a plurality of sensors installed in each of the tire of the motor vehicle wherein each sensor module has a radio signal transmitter for transmitting the conditions of the tires and a specific code of the sensor module via the radio frequency signal, and the said code learning device comprising:

an electric module having a processor and a memory; and a radio signal receiver electrically coupled to the electric module for receiving the radio frequency signals, and dividing the radio frequency signals into a data signal and an amplitude signal wherein the data signal comprises the conditions of the tires and the specific code of the sensor module thereby confirming the corresponding relation between the tires and the sensor module installed in it via the numeric value of the amplitude signal.

2. The code learning device for tire pressure monitor as claimed in claim 1 further comprising:

three slave electric modules, wherein each has a processor and a memory;

three radio signal receivers, wherein each is electrically coupled to the three slave electric modules respectively for receiving the radio frequency signals, and dividing the radio frequency signals into a data signal and an amplitude signal, wherein the data signal comprises the conditions of the tires and the specific code of the sensor module; and a serial data input and a serial data output for electrically coupled with the slave electric modules for the data transmission, thereby lettingthe electric module and the slave electric modules correspond with the four tires of the motor vehicle, and confirming the corresponding relation between the four tires and the sensor module installed in them via the numeric value of the amplitude signal.

3. The code learning device for tire pressure monitor as claimed in claim 1, further comprising a radio frequency signal transmitter for transmitting the corresponding relation between the tires and the sensor module installed in it to the tire pressure monitor of the motor vehicle via the radio frequency signal.

4. The code learning device for tire pressure monitor as claimed in claim 1, wherein the said amplitude signal can confirm the position of the tire when its value is higher than the predetermined value.

5. The code learning device for tire pressure monitor as claimed in claim 1, wherein the said electric module further comprises a monitor for the operator to observe the operation of the code learning device more easily.

* * * * *